United States Patent [19]
Lowe, Jr.

[11] 3,990,397
[45] Nov. 9, 1976

[54] SANITARY PET BOX STRUCTURE
[76] Inventor: Henry E. Lowe, Jr., Jones, Mich. 49061
[22] Filed: Apr. 28, 1975
[21] Appl. No.: 571,956

[52] U.S. Cl. ............................................. 119/1
[51] Int. Cl.² ..................................... A01K 29/00
[58] Field of Search ..................................... 119/1

[56] References Cited
UNITED STATES PATENTS

| | | | |
|---|---|---|---|
| 2,741,223 | 4/1956 | Winborn, Jr. | 119/1 |
| 2,971,493 | 2/1961 | Robb | 119/1 |
| 3,688,741 | 9/1972 | Thompson et al. | 119/1 |
| 3,757,738 | 9/1973 | Hall | 119/1 |
| 3,762,369 | 10/1973 | Barnum | 119/1 |

*Primary Examiner*—Hugh R. Chamblee
*Attorney, Agent, or Firm*—Marmaduke Hobbs

[57] ABSTRACT

A sanitary pet box structure having a container with a space therein for holding feces receiving material, and a pet support section adapted to seat on the container and having an elongated opening disposed over the space for the material. Along each side of the opening is a relatively flat area for supporting the respective front and rear paws of the pet, with said opening extending longitudinally with respect to the pet's body. The unit preferably has inwardly and downwardly sloping sides so that the pet is forced to use the areas along each side of the elongated opening for the support of its paws and body. The support unit normally is used in conjunction with a container; however, it may be, in some instances, used in connection with a conventional toilet or commode.

8 Claims, 5 Drawing Figures

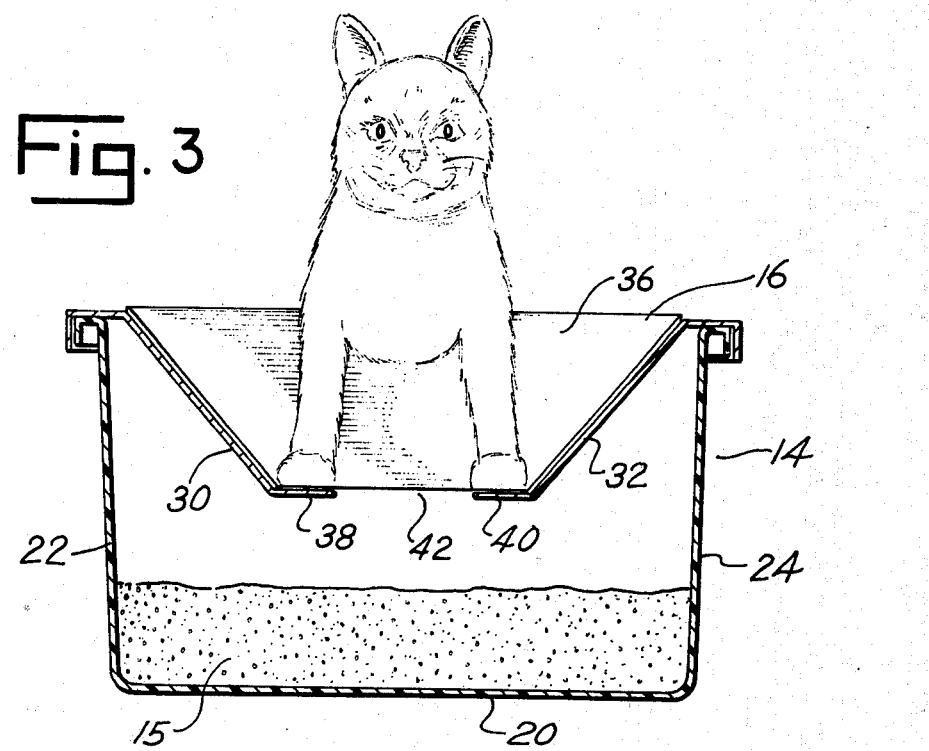
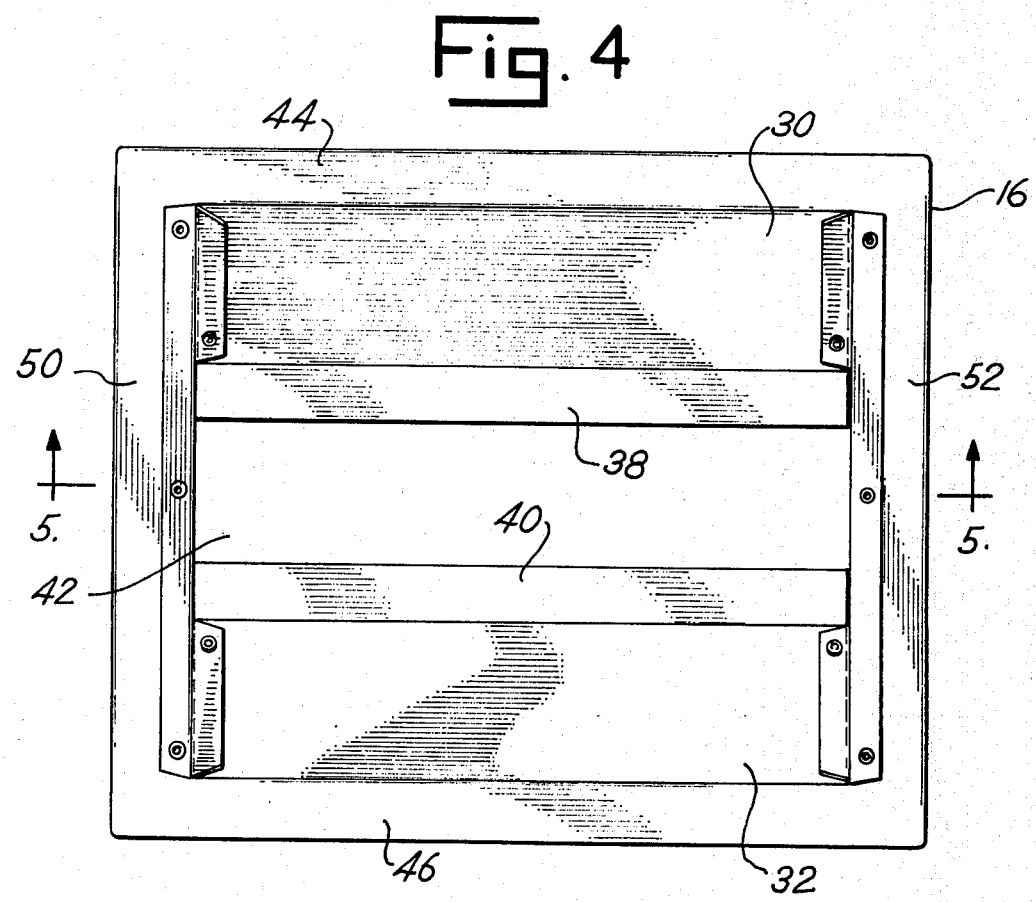

SANITARY PET BOX STRUCTURE

SANITARY PET BOX STRUCTURE

When cats and other pets are kept in apartments and homes, they are often provided for their daily habit with a box or pan containing a filler material, such as sand, sawdust or a loose material prepared specifically for this purpose, which functions as a deodorant and an absorbent. A plain box or pan is normally unsatisfactory for this purpose, since the cat usually scratches and digs in the filler material both before and after it has used the box, and consequently throws and scatters the filler material over the sides of the box onto the floor, and may thereafter track the material over the floor of the home. The material which adheres to the cat's feet is sometimes soiled, thus making the tracks on the floor particularly objectionable and difficult to remove. Further, the cat, in using the box, occasionally places itself in such a position near the sides of the box that the waste (feces or urine) is not discharged or lodged on the filler material or even in the box, thus making it impossible for the cat to cover the waste in its normal manner. It is therefore one of the principal objects of the present invention to provide a sanitary box, pan or other container for use by pets, primarily cats, in their normal daily care, which forces the cat to position itself over the material in the box and yet permits the cat to scratch the material after using the box to cover its waste, without scattering or throwing the material from the box, and which is so constructed and designed that the cat will inherently place itself in proper position without resting or sitting on the filler material or coming in contact with the sides or ends of the box, while discharging its waste into the box.

Another object of the present invention is to provide an easily cleaned sanitary box or pan of the aforesaid type, which can readily be disassembled for effective emptying and cleaning, and which prevents the pet from walking, stepping or standing in the filler material and/or waste in the box and then tracking the material over the floor of the home.

Still another object of the invention is to provide a cat box or pan which permits the pet to enter and leave easily without coming in contact with the filler material, and to place itself naturally in or on the box structure in a position which assures discharging of the waste near the center of the box.

A further object is to provide a sanitary pet box or pan which effectively obtains the foregoing advantages, and yet is simple in construction and design and attractive in appearance, and which can be constructed from a variety of materials capable of being easily cleaned and maintained in sanitary condition over extended periods of use.

Another object of the invention is to provide a structure for use in combination with a box or container for material for use by a pet in disposing of its normal daily waste, or for use with a toilet seat or bowl, which supports and orients the pet automatically to such a position that the waste is discharged in the receptacle near the center thereof without placing the pet in a cramped or other unnatural position.

Additional objects and advantages of the present invention will become apparent from the following description and accompanying drawings, wherein:

FIG. 3 is a vertical cross sectional view through the box structure, again showing the cat, to illustrate the manner in which the box structure is used, the section being taken on line 3—3 of FIG. 1;

FIG. 4 is a top plan view of the present box structure; and

Figure 1:
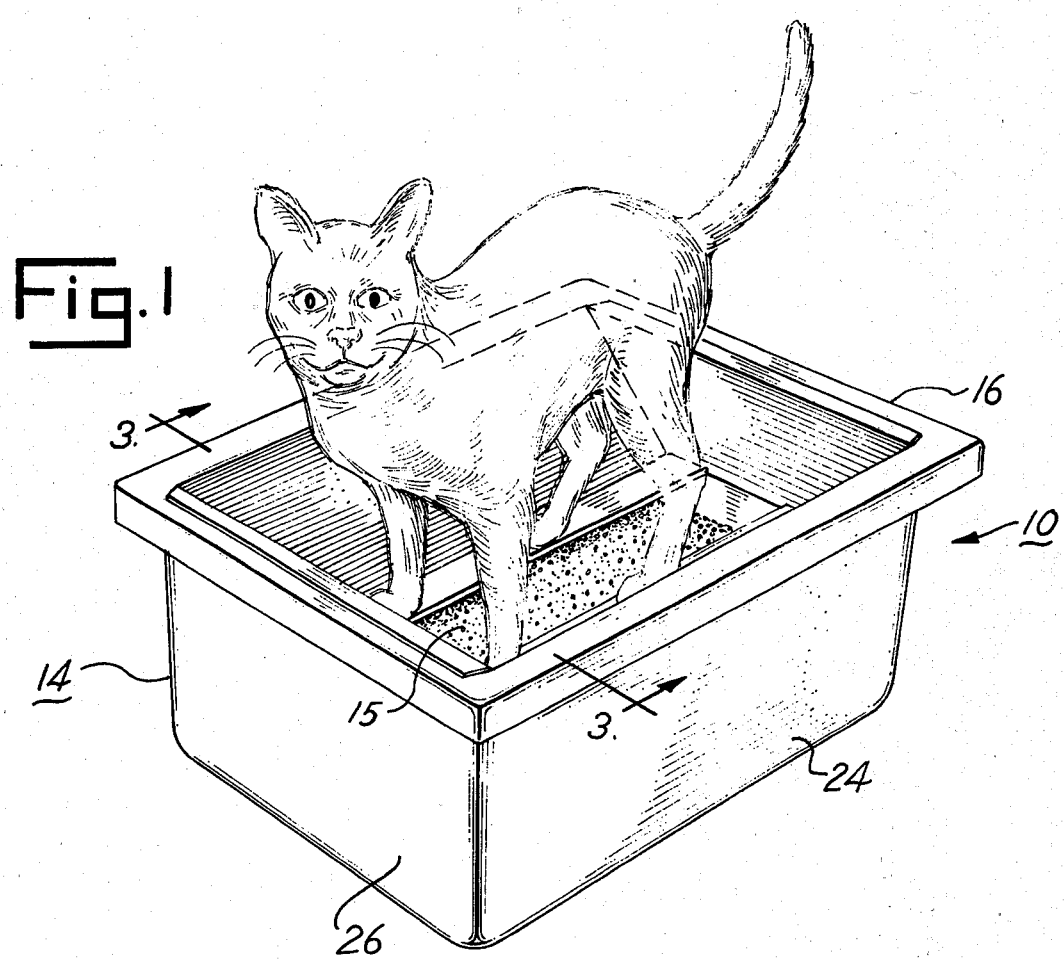
FIG. 1 is a perspective view of the present sanitary pet box or pan structure showing the parts in their proper assembled relationship and a cat in position to use the box structure.

Referring more specifically to the drawings, numeral 10 designates generally the present sanitary pet box structure having a generally rectangular shaped pan or container 14 for holding litter or other filler material 15, and a pet orienting and support section 16 normally mounted on the upper periphery of the container 14. These two principal parts of the present pet pan may be of other overall shapes than shown, but the configuration in the drawings is believed to be most satisfactory. These two portions may be made of a variety of materials, such as plastic, metal or other suitable material, preferably of a material which can be easily cleaned, which is light for handling in emptying the used litter or other filler material and in reassembling the portions for further use. While the box or pan involving the present novel concept may be used by pets other than cats, it is designed primarily for use by cats and, for the convenience of description, the term "cat" will be used hereinafter, but without excluding the use of the invention in connection with similar structures for other kinds of pets. Likewise, for the present description, the terms "box" and "pan" are synonymous, and to eliminate duplication of words the term "box" will be used.

The container portion 14 in the drawings consists of a bottom 20 having two upwardly extending sides 22 and 24 connected integrally with the bottom, and two ends 26 and 28 connected integrally with the bottom and the two sides, thus forming a liquid and moisture containing structure. Bottom 20 may contain a plurality of strengthening ribs extending substantially the full length thereof, and the sides are of sufficient height that the cat orienting and support section is positioned above the litter or other material in the container when the structure is mounted in place on the upper periphery of the container.

The cat orienting and supporting section 16 consists of side panels 30 and 32 connected to end walls 34 and 36, the two side panels 30 and 32 sloping inwardly and downwardly and terminating in pet support strips or areas 38 and 40. The two strips 38 and 40 are spaced apart to provide an elongated opening or slot 42 in the longitudinal center of the support section, the two panels 30 and 32 and end walls 34 and 36 being joined to one another to form a rigid structure. The outer edges of the two panels have outwardly and downwardly extending channel members 44 and 46 and the two end walls 34 and 36 have outwardly and downwardly extending channel members 50 and 52, the ends of the channel members preferably being connected to one another to increase the rigidity of the cat support section 16. While the section shown in the drawings is illustrated as being constructed of metal, suitable plastic material would normally be used, so long as adequate strength is provided in the section to support a cat or other pet in the position illustrated in FIGS. 1 and 3.

Strips or areas 38 and 40 are flat and positioned in a horizontal plane to provide a good footing for the cat to stand in the manner best illustrated in FIG. 3. While the cat or other pet could be trained to position itself properly over opening 42, the inwardly and downwardly sloping sides 30 and 32 automatically place the cat in the proper position for discharging the waste, both feces and urine, through opening 42 and onto the litter or other filler material in container 14. The opening is preferably sufficiently wide that the cat must necessarily spread its rear legs apart in order to discharge the waste and hence assume a natural position when performing the function. The normal practice of a cat to cover its waste is not prevented by the support section since the cat is able to stand on strips 38 and 40 with three paws and reach through the opening 42 with one of the front paws to scratch the material over the waste.

Figure 2:
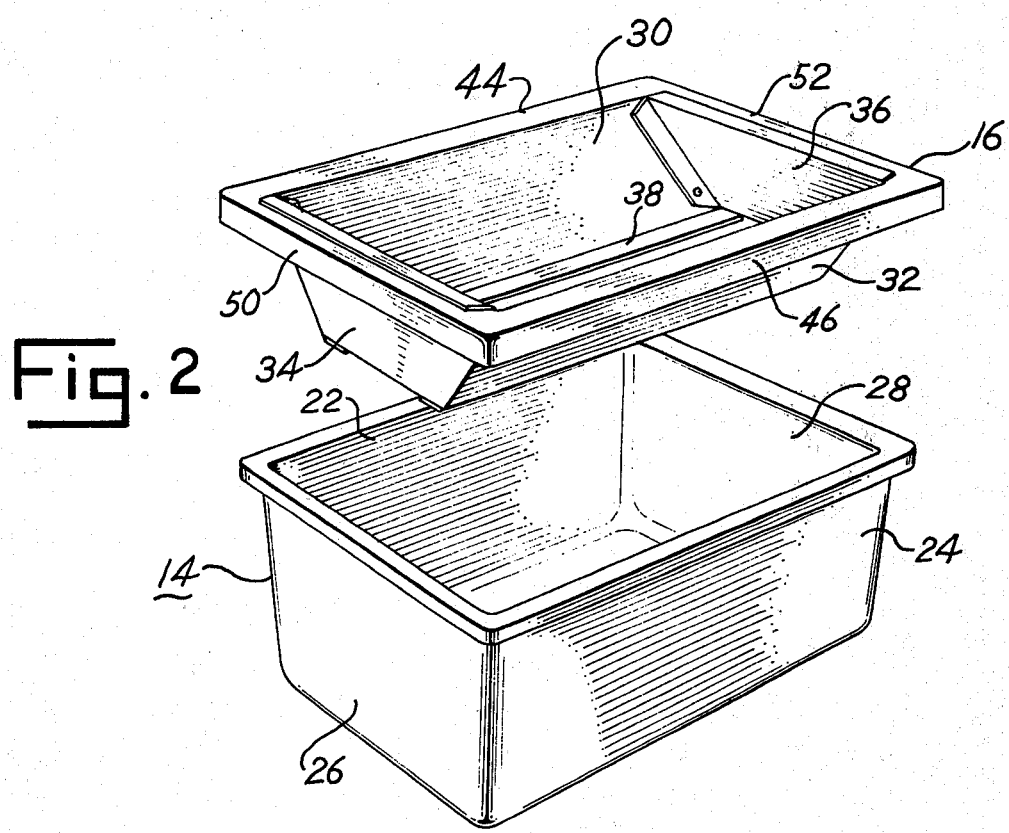
FIG. 2 is an exploded perspective view of the parts of the pet box structure shown in FIG. 1.
Figure 5:
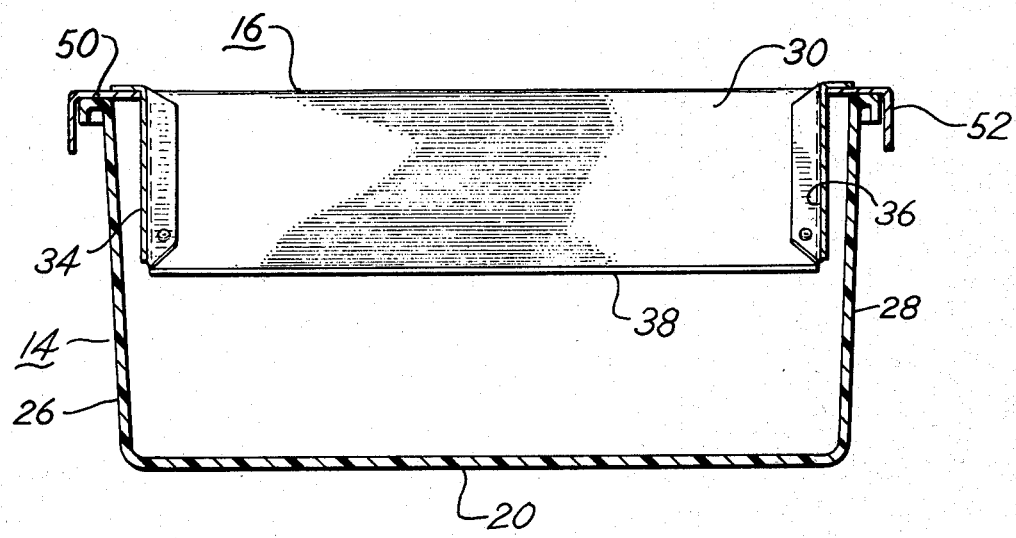
FIG. 5 is a longitudinal vertical cross sectional view of the box structure shown in the preceding drawings, the section being taken on line 5—5 of FIG. 4.

The primary advantage or purpose of providing section 16 with the cat support areas or strips 38 and 40 is to prevent the cat or other pet from walking or stepping in the litter or other filler material, and thereafter tracking the material over the floor. Section 16 also prevents the cat from scratching and throwing the material from the box when it is preparing to discharge its waste. The section can be easily removed from container 14 by merely lifting the section from the container in the manner illustrated in FIG. 2. Thereafter the container can be emptied, cleaned and refilled with clean litter or other material. The level of the material in the container should be spaced from the bottom side of section 16 sufficiently that the discharged waste will fall completely through the opening and be covered with the material without the pile extending through the opening or being sufficiently close to the opening that it would interfere with subsequent uses by the cat.

In the use and operation of the present sanitary pet box structure, litter or other filler material, preferably of a rather loose texture, is placed in container 14 to the approximate height illustrated in FIG. 3, with the upper surface of the filler material being spaced below the bottom of section 16. The pet orienting and support section 16 is then mounted in place on the upper periphery of the container and the box is ready for use. The box structure, when filled and assembled in the foregoing manner, is placed in a convenient location for the pet. When the pet desires to use the box, it steps onto strips 38 and 40, with the two right paws, for example, on strip 38, and the two left paws on strip 40. This places the cat in the proper orientation and position for discharging the waste through opening 42. The two strips and the opening inherently and naturally place the cat lengthwise of opening 42 with its head toward one end and tail toward the other end wall, but spaced from the respective end walls 34 and 36. The cat may wish to scratch or dig in the normal manner in preparation for performing his bowel movement, and the structure permits this natural practice of cats to be performed by the cat using one of its front paws to reach through opening 42 without stepping onto the material. The cat then positions itself over the opening 42, with the head facing one end and its tail pointing toward the other end. The strips are positioned downwardly from the upper edge of the two end walls 34 and 36 to cause the cat to position itself away from the end walls, thus causing the cat to discharge the waste through the opening without fouling either the edges of strips 38 or 40 or the two end walls 34 and 36. After the cat has completed its bowel movement, it can easily reach through opening 42 with one paw while standing on strips 38 and 40 with the other three legs to cover the feces deposited on the litter or other material in the container.

Thus the complete and natural practice of the cat is performed without the cat stepping or standing on the material in the container and with only one paw contacting the material. Thus when the cat leaves section 16 of the box, it is unlikely that any material will have adhered to the cat's paw or other parts of its body, thus eliminating the tracking of the material from the box onto the floor. It can be appreciated that any position of the cat on section 16 other than that previously described herein, i.e. with the cat's body oriented parallel with opening 42 and with the two right paws, for example, on strip 38 and the two left paws on strip 40, is unlikely. This is the only natural position in which the cat can use the box. The sloping panels 30 and 32 make it virtually impossible for the cat to stand in a transverse position with respect to opening 42 and, while in such position, perform the function of discharging its waste. When it is desired to clean the present sanitary pet box, the cat orienting and support section 16 is lifted from the container, and the loose material containing the waste is emptied from the container 14 which is then suitably cleaned and refilled with clean litter or other material. Section 16 is then reassembled on the container, and the assembled box is again placed in a location convenient for use by the cat.

While only one embodiment of the present sanitary pet box structure has been described in detail herein, various changes and modifications may be made without departing from the scope of the invention.

I claim:

1. A sanitary pet box structure, comprising a container having a generally open top and a space therein for feces receiving material, a pet support section having a means adapted to engage with the container, side panels connected to said means and extending downwardly and inwardly from opposite sides of said means at an acute angle, said side panels terminating in horizontal pet support strips spaced apart to define a relatively narrow elongated opening therebetween for communicating with said space within said container, whereby in use a pet's paws are directed by said side panels to said support strips for supporting the pet directly over the opening.

2. A sanitary pet box structure as defined in claim 1 in which said container is generally rectangular in shape and said pet support section is adapted to seat on the upper periphery thereof.

3. A sanitary pet box structure as defined in claim 1 in which said pet support section includes end walls that are substantially vertical and are disposed adjacent the respective end of the elongated opening.

4. A sanitary pet box structure as defined in claim 1 in which the end walls of said pet support section are substantially vertical and are disposed adjacent the respective end of the elongated opening, and said opening extends from end wall to end wall.

5. A sanitary pet support structure for use with a container having a generally open top and a space therein for feces receiving material, comprising a means adapted to engage with the container, side panels connected to said means and extending downwardly and inwardly from opposite sides of said means at an acute angle, said side panels terminating in horizontal pet support strips spaced apart to define a relatively narrow elongated opening therebetween for communicating with said space within said container, whereby in use a pet's paws are directed by said side panels to said support strips for supporting the pet directly over the opening.

6. A sanitary pet support as defined in claim 5 in which walls are disposed at each end of said elongated opening.

7. A sanitary pet support as defined in claim 5 in which said pet support includes end walls that are disposed adjacent the respective end of the elongated opening and are substantially vertical.

8. A sanitary pet support as defined in claim 5 in which end walls of said pet support are disposed adjacent the respective end of the elongated opening and are substantially vertical, and said opening extends from end wall to end wall.

* * * * *